United States Patent
Wu

(10) Patent No.: US 9,738,106 B2
(45) Date of Patent: Aug. 22, 2017

(54) DIGITALLY PRINTED ANTI-COPY DOCUMENT AND PROCESSES AND PRODUCTS THEREFOR

(71) Applicant: Judy Wailling Wu, Markham (CA)

(72) Inventor: Judy Wailling Wu, Markham (CA)

( * ) Notice: Subject to any disclaimer, the term of this patent is extended or adjusted under 35 U.S.C. 154(b) by 0 days.

(21) Appl. No.: 14/243,543

(22) Filed: Apr. 2, 2014

(65) Prior Publication Data

US 2014/0327237 A1 Nov. 6, 2014

Related U.S. Application Data

(63) Continuation of application No. 11/303,875, filed on Dec. 16, 2005, now abandoned.

(60) Provisional application No. 60/636,498, filed on Dec. 16, 2004.

(51) Int. Cl.
| | |
|---|---|
| H04N 1/40 | (2006.01) |
| B42D 15/00 | (2006.01) |
| H04N 1/00 | (2006.01) |
| B44F 1/10 | (2006.01) |
| B42D 25/29 | (2014.01) |
| H04N 1/32 | (2006.01) |
| B41M 3/10 | (2006.01) |
| H04N 1/405 | (2006.01) |
| B41M 3/14 | (2006.01) |

(52) U.S. Cl.
CPC ............ *B42D 15/00* (2013.01); *B42D 25/29* (2014.10); *B44F 1/10* (2013.01); *H04N 1/00838* (2013.01); *H04N 1/00864* (2013.01); *H04N 1/00883* (2013.01); *B41M 3/10* (2013.01); *B41M 3/14* (2013.01); *H04N 1/32144* (2013.01); *H04N 1/32203* (2013.01); *H04N 1/32219* (2013.01); *H04N 1/4051* (2013.01)

(58) Field of Classification Search
CPC combination set(s) only.
See application file for complete search history.

(56) References Cited

U.S. PATENT DOCUMENTS

| | | | |
|---|---|---|---|
| 5,258,850 A | 11/1993 | Tai | |
| 5,340,159 A * | 8/1994 | Mowry, Jr. | ................... 283/93 |
| 5,398,283 A | 3/1995 | Virga | |
| 5,457,554 A | 10/1995 | Faris | |
| 5,537,486 A | 7/1996 | Stratigos et al. | |
| 6,104,502 A | 8/2000 | Shiomi | |
| 6,118,935 A | 9/2000 | Samworth | |
| 6,272,485 B1 | 8/2001 | Sragner | |
| 6,752,432 B1 | 6/2004 | Richardson | |
| 6,775,029 B1 * | 8/2004 | Wen et al. | ................... 358/1.9 |
| 7,114,750 B1 | 10/2006 | Alasia et al. | |
| 7,307,761 B2 | 12/2007 | Man | |

(Continued)

OTHER PUBLICATIONS

U.S. Office Action dated Jan. 3, 2014 issued in U.S. Appl. No. 11/303,875.

(Continued)

*Primary Examiner* — Richard Zhu
(74) *Attorney, Agent, or Firm* — Grossman, Tucker, Perreault & Pfleger, PLLC

(57) ABSTRACT

The present invention relates to a method and product resulting from application distortion security images in an anti-copy document, printed on demand, which may be variable and use laser printers or printer/copiers and/or ink-jet printers and/or digital presses.

18 Claims, 4 Drawing Sheets

(56) References Cited

U.S. PATENT DOCUMENTS

| | | | |
|---|---|---|---|
| 7,634,112 B1* | 12/2009 | Lefevere et al. | 382/112 |
| 2005/0094844 A1 | 5/2005 | Damera-Venkata | |
| 2005/0190411 A1* | 9/2005 | Ohno | 358/3.28 |
| 2006/0170974 A1* | 8/2006 | Wang et al. | 358/3.06 |

OTHER PUBLICATIONS

U.S. Office Action dated Jan. 13, 2011 issued in U.S. Appl. No. 11/303,875.
U.S. Office Action dated May 6, 2010 issued in U.S. Appl. No. 11/303,875.
U.S. Office Action dated May 22, 2009 issued in U.S. Appl. No. 11/303,875.
U.S. Office Action dated Jun. 4, 2012 issued in U.S. Appl. No. 11/303,875.
U.S. Office Action dated Jun. 4, 2013 issued in U.S. Appl. No. 11/303,875.
U.S. Office Action dated Jul. 14, 2011 issued in U.S. Appl. No. 11/303,875.
U.S. Office Action dated Oct. 13, 2009 issued in U.S. Appl. No. 11/303,875.
U.S. Office Action dated Nov. 22, 2011 issued in U.S. Appl. No. 11/303,875.

* cited by examiner

Kapow! Future of copyright measure clouded over boxing dispute

By Ted Bridis / Associated Press

WASHINGTON - Congress will have a narrow opportunity when it returns to pass legislation making it a crime to use video cameras to record films in movie theaters, but the bill could be floored by a fight over [Ju^rj] boxing commission.

The House would need to proposals when it reconvenes early next month to consider The Senate over the "Family Entertg|S|i|Mf and Copyright Act of ...ht protections
vie scenes
e Senate bill 't
onally 'ears in
on for a
2
0

04," which cracks for fledgling technolo depicting sex, vi

About 10 st would permi witness the illic ^recording m first offense, and rests w Some controversial copyright the Senate bill, such as a provis proposal to make it easier ternet users who for the Justice illegally distribute face high civil more than 1,000 cop penalties if they are caught and Provisions of the Senate cojjyri other legislation in the _rences House but would jpBeca between the bills jallyiitaosals need i believe th could be deraile<
Industry and reforms add
consume iinwol, e gr
the larg chief!  Recording in the House becaus<  "They'll either
"We'll see how this out," Industry Association of America, try work it out in December or early^  ar.

Sen. John McCain, R- Ariz.^Ujjjj.Jiired a proposal to create a thtipperson commission -appointed by the president - FoTTcense boxers, managers, promoters and sanctioning organizations. It would impose uniform health and safety standards, establish a centralized medical registry and provide uniform ranking criteria and contractual guidelines.

Similar legislation was introduced in the House but was never passed. "I don't know whether this is a poison pill for the bill," said Alan Davidson, associate director for the Washington-based Center for Democracy and Technology. "These were a carefully Grafted set of copyright provisions, but it's an open question whether the House will accept them with the boxing legislation attached."

FIG. 4

DIGITALLY PRINTED ANTI-COPY DOCUMENT AND PROCESSES AND PRODUCTS THEREFOR

CROSS REFERENCE TO RELATED APPLICATIONS

The present application claims the benefit of the filing date of U.S. Provisional Application Ser. No. 60/636,498 filed Dec. 16, 2004, the teachings of which are incorporated herein by reference.

FIELD OF THE INVENTION

The present invention relates generally to a method and product resulting from application of the method for making distortion security images in an anti-copy documents printed on demand can be variable using laser printers or printer/copiers and/or ink-jet printers and/or digital presses. Documents are produced according to the invention method, as well as alternative methods.

BACKGROUND

Many methods and products have been developed to prevent the unauthorized reproduction of original valuable documents, such as currency, traveler's checks, checks, coupons, gift certificates, licenses, passports, personal identification papers, and packaging material for brand protection to deter illegal activities such as counterfeiting. These documents may be produced using standard press processes such as but not limiting to offset printing (lithography), letterpress, flexographic, intaglio and gravure. Generally, these methods and products enable unauthorized copies of original documents to be readily distinguished from the originals.

Examples of such methods and products include embedding images and/or moiré patterns in the original documents that are nearly invisible to the naked eye but which become apparent upon photocopying. However, many of the described document protection methods and products are formulated for press printed documents. It is reportedly difficult for these technologies to be translated to print at a lower resolution digitally printed platform and remain effective against ever advancing reproduction equipment such as copiers and scanners. Variable security utilizing the above-mentioned methods and products wherein each printed document is varied and is unique and not fixed is non-existent and cost prohibitive.

Other methods and products have been developed to prevent the unauthorized reproduction of original documents to deter counterfeiting and may be produced on digital output devices such as laser printers and ink-jet printers and printed on demand. The methods and products may include (a) the use of digital watermarking where a covert security feature is embedded into an image by making subtle changes to the data of the original digital content or (b) the use of encryption secured elements such as the use of encrypted barcodes linking actual data on the document with a barcode. However, most of these digitally printed document protection methods focus on the use of covert security features and the method of authentication is a physical mechanical scan of said features using scanners and authentication software.

Further methods and products such as using a "scrambled Indicia" covert security feature for example, which may be printed on demand with digital output devices, are again related to the use of a covert security feature that must be authenticated by the use of a decoder. Many of these security features that are digitally printed using digital output devices such as laser printers and/or ink-jet printers and/or digital presses. The features may be variable, printed on demand and may be designed as covert features to prevent the unauthorized reproduction of original documents and may only be authenticated during the authentication process. However, these described document protection methods and printings produced using these methods concentrate on covert security features that may not be distorted by photocopiers.

Therefore, what is needed in the art is a document protection method and apparatus that enables a simple and expedient way to incorporate improved distortion security features, that may be variable and printed on demand into a digitally printed original document using laser printers (including laser copier/printer) and/or ink-jet printers and/or digital presses such as but not limited to the HP Indigo, Kodak Nexpress, Xeikon, and the Xerox IGen to prevent the unauthorized reproduction of original valuable documents through the use of photocopiers. Furthermore, what is needed in the art are original documents having improved distortion security features that when processed by a peripheral component of a personal computer, such as an optical scanner using OCR (Optical Character Recognition) software, will disrupt the ability of the software to render a true text version of the scanned document.

Moreover, what is needed in the art are methods for producing such original documents having such improved distortion security features calibrated for, modified, transformed and customized for each digital output device such as laser printers and/or ink-jet printers and/or digital presses.

SUMMARY

The present invention provides methods for digitally printing on demand original documents with improved distortion anti-copy security features against photocopiers and a method for digitally printing on demand original documents with an anti-OCR (Optical Character Recognition) distortion security feature against scanners and OCR software.

The present invention may allow original documents to be printed on demand and may be variable using standard laser or ink-jet printers and/or digital presses embedded with a secure bitmap art file that is anti-photocopy and anti-OCR to prevent unauthorized duplication and reproduction of originals.

Furthermore, this invention may provide an improved method for printing originals using digital printers and digital presses on demand to defeat unauthorized copying using copiers and computer practices.

This invention may be applied to standard press processes such as but not limited to offset printing (lithography), letterpress, flexographic, intaglio and gravure.

BRIEF DESCRIPTION OF THE DRAWINGS

The above-mentioned and other features and advantages of this invention, and the manner of attaining them, will become appreciated and be more readily understood by reference to the following detailed description of one embodiment of the invention in conjunction with the accompanying drawings, wherein:

FIG. 4 shows the document of FIG. 1 after having been processed by a standard optical processing device, such as a scanner and most OCR software, wherein the document includes a secure electronic bitmap art file with the distortion security feature.

Corresponding reference characters indicate corresponding parts throughout the several views. The example set out herein illustrates one preferred embodiment of the invention, in one form, and is not to be construed as limiting the scope of the invention.

DETAILED DESCRIPTION

Figure 1:
FIG. 1 shows an embodiment of an original document printed on standard laser printer incorporating a distortion security feature in the form of a secure electronic bitmap art file of the present invention.
Figure 2A:
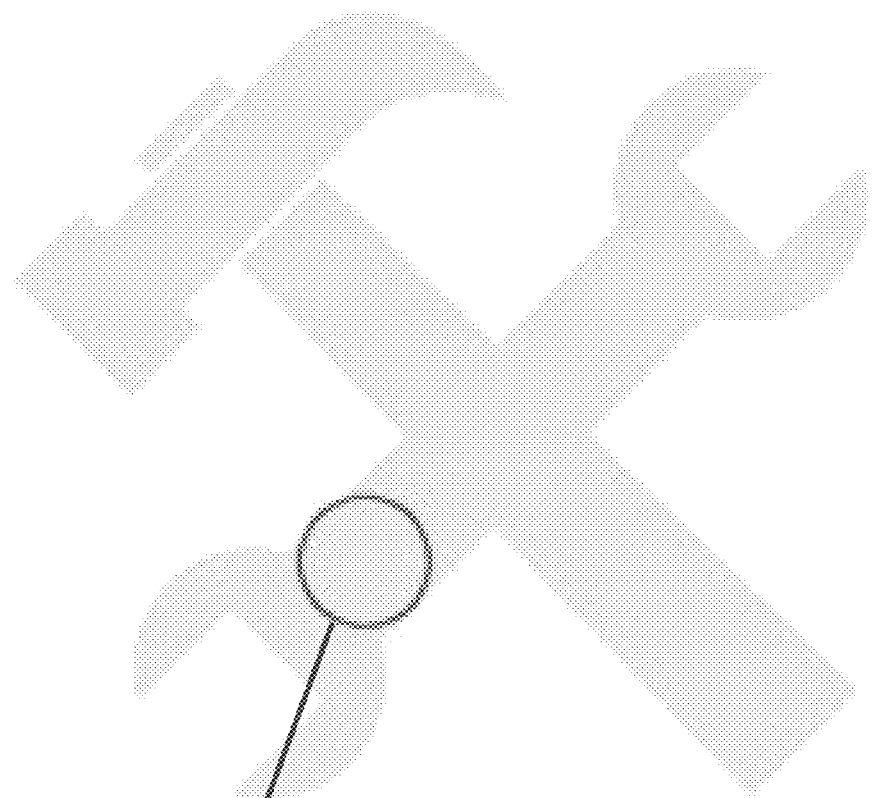
FIGS. 2a and 2b shows the secure electronic bitmap art file and FIG. 2b shows a close up the secure electronic bitmap art file of the present invention showing both amplitude modulated and frequency modulated halftone screening techniques used within the same secure electronic bitmap art file.
Figure 2B:
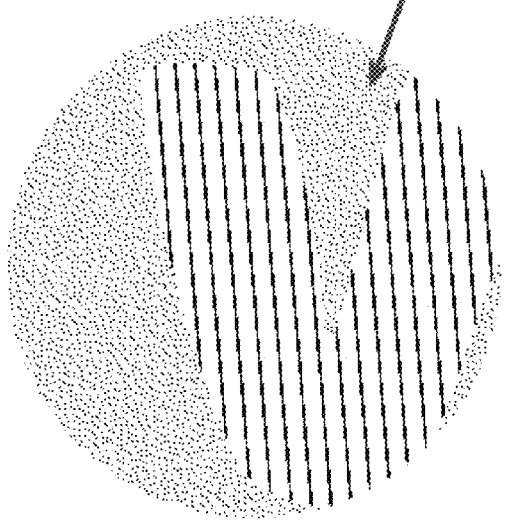
Figure 3:
FIG. 3 shows the document of FIG. 1 after having been processed by a photocopying machine, wherein the document includes a secure electronic bitmap art file with the distortion security feature.

The present invention relates to a method and product for printing anti-copy documents using any toner or ink based digital printing equipment such as laser printers, laser printer copiers, ink-jets printers and digital presses by using both amplitude modulated and frequency modulated halftone screening techniques within the same document. Designated anti-copy areas within the document are digitally printed using traditional amplitude modulated halftone elements against areas that are printed using frequency modulated halftone elements.

A digitally generated electronic distortion security feature may include a unique pattern using both amplitude modulated and frequency modulated halftone screening techniques within the same document. The halftone screening techniques may be applied at predetermined relative densities, and at predetermined relative angular orientations, and these unique screening techniques may be modified, calibrated and customized to the specific output device. The distortion security features may be printed on each unique and variable document on demand using standard laser or ink jet printers, or laser printer/copiers or digital presses.

After processing of the document by a photocopying machine, the electronic security features may alter the document from its original state to reveal the intended distorted security feature. Accordingly, the distortion security feature may disrupt the scanning and OCR interpretation of the text of the original document rendering the scanned image inoperable. Furthermore, it is possible to incorporate the electronic security features into a template for use with known software programs such as, but not limited to Microsoft Word, Microsoft Excel, Adobe PDF, Corel WordPerfect and so on.

The digitally printed document may be printed using toner or ink based digital printing equipment. The document may have a portion of the printed area printed with amplitude modulated halftone elements and an adjacent printed area printed with frequency modulated halftone elements in which the copiers and scanners will reproduce the amplitude modulated area substantially differently then the frequency modulated area. The amplitude modulated area may consist of conventional halftone elements of dots that are round, diamond, ellipse, square, cross or any other form such as continuous lines, broken lines, dashes, wavy lines placed at specified and uniform line angles and line frequency. The number of halftone elements used may be fixed; however, the size of each halftone element may vary. The frequency modulated area may consist of halftone elements where these elements are placed randomly according to various advance algorithms to determine the optimum placement of dots. The size of each halftone element may be fixed; however, the number of halftone elements may vary.

The digitally printed document may be produced using a digital electronic bitmap art file including areas halftoned using conventional halftone elements of dots that are round, diamond, ellipse, square, cross or any other form such as continuous lines, broken lines, dashes, wavy lines placed at specified and uniform line angles and line frequency and areas halftoned using halftone elements where these elements are placed randomly according to various advanced algorithms to determine the optimum placement of dots. The secure electronic bitmap art file may be set at the same resolution of the output digital print equipment. The secure electronic bitmap art file may also be set at a multiple of the resolution of the output digital print equipment.

Other text and/or artwork files may be digitally printed directly on top of and/or beside the secure bitmap art file at the same print time as the secure bitmap art file or later after the secure bitmap art file has already been printed onto a document. The secure bitmap art file may be varied with each page within a digitally printed multiple page document. Furthermore, the secure bitmap art file may be printed using toner or ink based digital print equipment in any color toner and/or ink that is available for that digital print equipment. The secure bitmap art file may also be printed by a toner or ink based digital print equipment using color combination of toner and/or ink that is available for that digital print equipment. The resolution of the digital printing devise may range from 600 dpi (dots per inch) and upward to the maximum resolution possible by advancing print equipment capabilities. Accordingly, copiers may reproduce the amplitude modulated halftone elements within the secure bitmap art file substantially differently from the frequency modulated halftone elements within the same secure bitmap art file.

While this invention has been described as having a preferred design, the present invention can be further modified within the spirit and scope of this disclosure. This application is therefore intended to cover any variations, uses, or adaptations of the present invention using the general principles disclosed herein. Further, this application is intended to cover such departures from the present disclosure as come within the known or customary practice in the art to which this invention pertains and which fall within the limits of the appended claims.

What is claimed is:

1. A method of digitally on demand printing a security feature onto an original document containing text, which protects the text of the original document from unwanted optical character recognition, comprising:

digitally generating a security feature as an electronic bitmap art file, wherein the security feature includes amplitude halftone elements and frequency modulated halftone elements which are modified, calibrated and customized to a printing device, wherein said amplitude modulated halftone elements are placed at uniform frequencies and the size of said amplitude modulated halftone elements vary and said frequency modulated halftone elements are placed randomly and the size of said frequency modulated halftone elements are fixed;

digitally printing with said printing device the digitally produced security feature and text onto a document at the same time;

creating an original document with a security feature and text positioned over and beside said security feature to form a printed area, wherein the security feature is located under only a portion of said printed area of said original document, and renders the text anti-OCR; and scanning said original document and performing optical character recognition on said original document, wherein said scanning reproduces said amplitude modulated halftone elements and said frequency modulated halftone elements and upon optical character recognition at least a portion of said text positioned over said amplitude modulated halftone elements and frequency modulated halftone elements of said security feature is illegible and non-readable.

2. The method of claim 1, wherein art work is digitally printed on the document at the same time as the security feature and the text.

3. The method of claim 1, wherein modifying the security feature includes adjusting the size and placement of the halftone elements with algorithms.

4. The method of claim 1, where the original document includes multiple pages and the security feature is variable with each page.

5. The method of claim 1, wherein said amplitude modulated halftone elements and frequency modulated halftone elements are configured to reproduce differently when photocopied to reveal a distortion image.

6. The method of claim 1, wherein said amplitude modulated halftone elements include lines and said frequency modulated halftone elements include dots.

7. A method of printing an anti-copy, anti-optical character recognition security feature on a document, comprising:

generating a security feature including amplitude modulated halftone elements and frequency modulated halftone elements and calibrating the security feature to a printing device, such that the security feature is configured to render illegible text printed on the security feature upon optical character recognition and distort the security feature upon photocopying, wherein said amplitude modulated halftone elements are placed at uniform frequencies and the size of said amplitude modulated halftone elements vary and said frequency modulated halftone elements are placed randomly and the size of said frequency modulated halftone elements are fixed;

creating a digital electronic bitmap art file of the security feature;

digitally printing on the document with said printing device the security feature and the text on and beside the security feature at the same time to create a printed area on said document, on demand using the printing device to create an original document, wherein said security feature is located under only a portion of said printed area of said original document; and scanning said original document and performing optical character recognition on said original document, wherein said scanning reproduces said amplitude modulated halftone elements and said frequency modulated halftone elements and upon optical character recognition at least a portion of said text over said amplitude modulated halftone elements and frequency modulated halftone elements of said security feature is illegible and non-readable.

8. The method of claim 7, wherein the document is a multiple page document and the security feature is varied with each page of the document.

9. The method of claim 7, further comprising providing the security feature as a template in a software program.

10. The method of claim 7, wherein the security feature includes a distortion image that is configured to be revealed and distorted by photocopying.

11. The method of claim 7, further comprising digitally printing artwork on the document at the same time as the security feature and text.

12. The method of claim 7, wherein said amplitude modulated halftone elements include lines and said frequency modulated halftone elements include dots.

13. A method of digitally on demand printing a security feature onto an original document containing text, which protects the text of the original document from unwanted optical character recognition, comprising:

digitally generating a security feature including amplitude modulated halftone elements and frequency modulated halftone elements as an electronic bitmap art file, wherein said amplitude modulated halftone elements are placed at uniform frequencies and the size of said amplitude modulated halftone elements vary and said frequency modulated halftone elements are placed randomly and the size of said frequency modulated halftone elements are fixed;

modifying, calibrating and customizing the security feature to a printing device wherein modifying said security feature includes adjusting the size and placement of said amplitude modulated and frequency modulated halftone elements with algorithms;

digitally printing with said printing device the digitally produced security feature and text onto a document at the same time;

creating an original document with multiple pages including a security feature and text positioned on and beside the security feature in a printed area wherein the security feature is varied on each page, and the security feature is located under only a portion of said printed area of said original document rendering the text anti-OCR; and scanning said original document and performing optical character recognition on said original document, wherein said scanning reproduces said amplitude modulated halftone elements and said frequency modulated halftone elements and upon optical character recognition at least a portion of said text positioned over said amplitude modulated halftone elements and frequency modulated halftone elements of said security feature is illegible and non-readable.

14. The method of claim 13, wherein the text is printed beside the security feature.

15. The method of claim 13, wherein art work is digitally printed on said document at the same time as the security feature and the text.

16. The method of claim 13, wherein digitally printing the security feature is performed on a digital printing equipment.

17. The method of claim 13, wherein said amplitude modulated halftone elements and frequency modulated halftone elements are configured to reproduce differently when photocopied to reveal a distortion image.

18. The method of claim 13, wherein said amplitude modulated halftone elements include lines and said frequency modulated halftone elements include dots.

\* \* \* \* \*